United States Patent [19]

Newsome

[11] Patent Number: 4,947,994
[45] Date of Patent: Aug. 14, 1990

[54] CONTAINER WRAPPER, AND METHODS AND APPARATUS FOR MAKING SAME

[75] Inventor: Reginald W. Newsome, Richmond, Va.

[73] Assignee: Scepter Manufacturing Company Limited, Don Mills, Ontario, Canada

[21] Appl. No.: 374,640

[22] Filed: Jun. 30, 1989

Related U.S. Application Data

[63] Continuation of Ser. No. 198,502, May 25, 1988, abandoned.

[51] Int. Cl.$^5$ .......................... B65D 5/54; B65D 5/62
[52] U.S. Cl. ..................... 206/606; 206/264; 206/616; 229/87.05; 229/87.18
[58] Field of Search ................ 229/87 C, DIG. 12, 229/160.1; 206/606, 615, 616, 245, 264, 268, 273–275, 621; 428/43

[56] References Cited

U.S. PATENT DOCUMENTS

| | | | |
|---|---|---|---|
| 1,589,603 | 6/1926 | Lee | 206/616 |
| 2,344,559 | 3/1944 | Newman | 206/616 |
| 2,579,443 | 12/1951 | Snyder | 428/43 |
| 2,592,734 | 4/1952 | Pike | 206/606 |
| 2,641,732 | 2/1972 | Fujio | 229/DIG. 12 |
| 2,963,213 | 12/1960 | Nauman | 206/606 |
| 3,080,238 | 3/1963 | Kraft et al. | 206/616 |
| 3,260,405 | 7/1966 | Frischer et al. | 206/264 |
| 3,387,736 | 6/1968 | Williamson | 206/621 |
| 3,456,780 | 7/1969 | Ferman | 229/DIG. 12 |
| 3,494,538 | 2/1970 | Matthews | 206/616 |

FOREIGN PATENT DOCUMENTS

| | | | |
|---|---|---|---|
| 2730025 | 1/1979 | Fed. Rep. of Germany | 428/43 |
| 1514174 | 6/1978 | United Kingdom | 229/87 C |
| 2031385 | 4/1980 | United Kingdom | 206/606 |

*Primary Examiner*—Gary E. Elkins
*Attorney, Agent, or Firm*—Blake, Cassels & Graydon

[57] ABSTRACT

An outer wrapper for a container which opens along an oblique parting line. The outer wrapper includes a tear tape having a pattern such that each segment of the parting line has an aligned tear tape segment. The tear tape thus tears the outer wrapper along the parting line to facilitate opening the container without interference from the remnants of the outer wrapper which may remain adhered to the container.

17 Claims, 3 Drawing Sheets

CONTAINER WRAPPER, AND METHODS AND APPARATUS FOR MAKING SAME

This is a continuation of application Ser. No. 198,502, filed May 25, 1988 now abandoned.

BACKGROUND OF THE INVENTION

This invention relates to container wrappers, and more particularly to container wrappers including tear strips for facilitating the opening of the wrapper. The invention also relates to methods and apparatus for making such wrappers with tear strips, to containers employing such wrappers with tear strips, and to methods and apparatus for making such containers.

Although the invention will be described in the illustrative context of outer wrappers for certain kinds of cigarette boxes, it will be understood that the invention has numerous other applications, and that the invention is not limited to use in the described context.

One popular type of cigarette packaging is the so-called "flip-top box". This is a cardboard box, the upper portion of which is partially cut at an angle so that the top portion of the box can be pivoted up and to the rear to allow the cigarettes to be removed. In particular, the front of the box is cut across at a predetermined distance down from the top, and each side is cut across from the adjacent end of the front cut up to a point at the rear which is substantially closer to the top than the front cut. This means that the cuts in the side walls are not parallel to the top and bottom of the box, but rather are inclined up toward the rear of the box. Stated another way, the plane defined by the front and side wall cuts is oblique (rather than perpendicular) to the vertical axis of the box (i.e., the axis to which the front, rear, and side walls are substantially parallel).

In order to help keep the contents of such boxes fresh, it is customary to wrap the box in an outer wrapper, which is usually a polypropylene film or web. To facilitate removal of this outer wrapper, a tear tape is typically included on the inner surface of the outer wrapper in the vicinity of the abovementioned cuts (which form the parting line between the pivotable upper portion of the box and the remaining lower portion) The tear tape extends annularly around the box in a plane perpendicular to the vertical axis of the box. To open the box, the tear tape is pulled out away from the box. This tears the polypropylene web and allows the web and tear tape to be removed and discarded. The upper portion of the box can then be pivoted up and to the rear as described above.

Recently, there has been increasing interest in reducing the amount of refuse associated with the use of cigarettes. For this purpose, it would be desirable if most or all of the polypropylene outer wrapper could be made to stay with the box after the box had been opened This can be done by such expedients as heat shrinking or otherwise adhering the outer wrapper to the box. Then, when the tear tape is pulled, only the tear tape and the immediately adjacent annular portion of the outer wrapper come off. The upper and lower portions of the outer wrapper remain adhered to the box The problem with this is that, because the tear tape is disposed in a plane perpendicular to the vertical axis of the box, while the parting line between the upper and lower portions of the box defines a plane oblique to that axis, the remnants of the outer wrapper tend to interfere with subsequent opening of the box.

In view of the foregoing, it is an object of this invention to provide improved outer wrappers for containers of the type described above.

It is a more particular object of the invention to provide outer wrappers having tear tapes which conform to the parting line between the parts of the container to which the outer wrapper is applied.

SUMMARY OF THE INVENTION

These and other objects of the invention are accomplished in accordance with the principles of the invention by providing outer wrappers having tear tapes, at least some longitudinal segments of which are inclined relative to other longitudinal segments so that the tear tape pattern can be made to conform to the parting line between the relatively movable parts of the container to which the wrapper is applied. The invention also encompasses containers including such outer wrappers, and methods and apparatus for making such wrappers and containers.

Further features of the invention, its nature and various advantages will be more apparent from the accompanying drawings and the following detailed description of the preferred embodiments.

DETAILED DESCRIPTION OF THE PREFERRED EMBODIMENT

Figure 1:
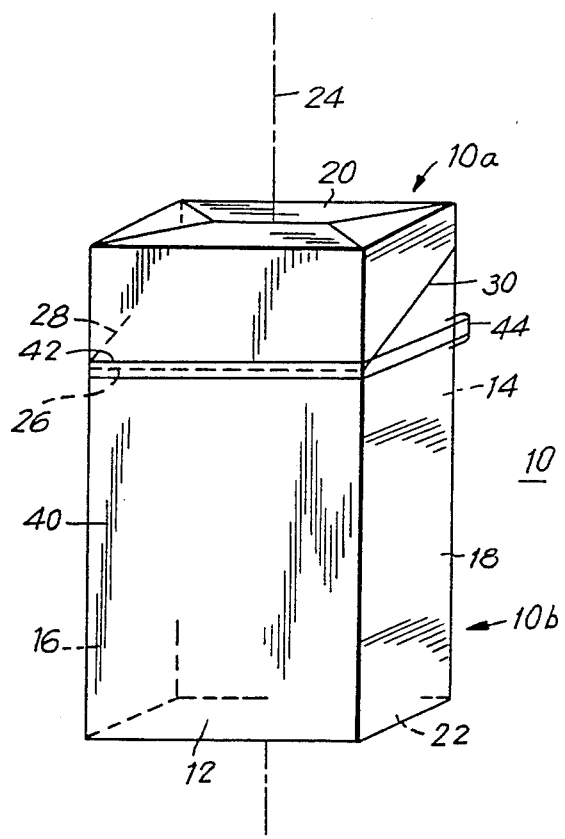
FIG. 1 is a simplified perspective view of a prior art cigarette box.

FIG. 1 shows a conventional flip-top cigarette box 10. Box 10 has front wall 12, rear wall 14, left side wall 16, right side wall 18, top wall 20, and bottom wall 22. Walls 12, 14, 16, and 18 are all substantially parallel to the vertical axis 24 of the box. Walls 20 and 22 are substantially perpendicular to that axis. Front wall 12 is cut horizontally across at 26 a predetermined distance below top wall 20. Each of side walls 16 and 18 is also cut across at 28 and 30, respectively, from the adjacent end of cut 26 to a point at rear wall 14 which is much closer to top wall 20 than cut 26. Cuts 28 and 30 are therefore not horizontal, but rather are inclined upward toward the rear of the box. Rear wall 14 is typically scored horizontally between the rear ends of cuts 28 and 30 so that when the outer wrapper (described below) is removed, the upper portion 10a of the box (above the parting line defined by cuts 26, 28, and 30) can be pivoted up and to the rear by bending rear wall 14 along this score line.

Box 10 is typically completely enclosed within a clear outer wrapper 40, generally made of polypropylene film, but which can alternatively be made of any other suitable web material such as cellophane, vinyl film, or the like. Wrapper 40 is typically applied by wrapping it around the box after the box has been fully assembled and filled. A tear tape 42, typically but not necessarily a colored polypropylene film, is applied to the inner surface of outer wrapper 40 near the top of box 10 to facilitate removal of outer wrapper 40. A small tail 44 of tear tape 42 is left projecting from one edge of the box to enable the consumer to grasp and begin to pull the tear tape. When tear tape 42 is pulled out away from the box, it tears the adjacent portion of outer wrapper 40. Because tear tape 42 extends annularly around the box, outer wrapper 40 is also torn annularly around the box and can be readily removed and discarded. This allows box 10 to be opened by pivoting upper portion 10a up and to the rear as described above.

Note that whereas tear tape 42 extends annularly around box 10 in a horizontal plane, the parting line between the upper 10a and lower 10b portions of box 10 defines a plane which is not horizontal, but rather is oblique to vertical axis 24. This means that unless outer wrapper 40 is removed from the box after tear tape 42 is pulled, the remnants of wrapper 40 will tend to undesirably interfere with opening of the box. Heretofore, this has made it impossible to secure outer wrapper 40 to box 10, which would otherwise be desirable to reduce the amount of refuse produced.

Figure 2:
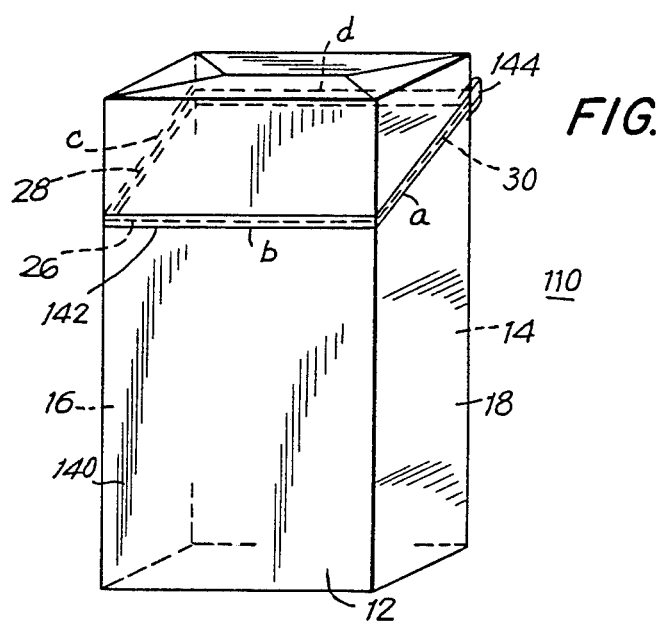
FIG. 2 is a view similar to FIG. 1 showing a box in accordance with the principles of this invention.

FIG. 2 shows a box 110 similar to box 10 but having an outer wrapper 140 which has been modified in accordance with this invention so that tear tape 142 is aligned with all portions of the parting line defined by cuts 26, 28, and 30. Along the front of box 110, longitudinal segment b of tear tape 142 is horizontal and overlies cut 26. Along the right side of box 110, tear tape 142 has a longitudinal segment a which is inclined and overlies cut 30. Along the left side of box 110, tear tape 142 has a longitudinal segment c which is again inclined and overlies cut 28. And along the rear of box 110, tear tape 142 has another horizontal segment d which overlies the above-described score line in rear wall 14. Accordingly, when tear tape 142 is torn away, it tears wrapper 140 exactly where required to allow box 110 to open without interference from the wrapper remnants. This means that, if desired, wrapper 140 can be left on box 110 after it has been opened. Thus container 110 can be made so that wrapper 140 is actually secured to box 110 (e.g., by a conventional adhesive or by conventionally shrink-wrapping wrapper 140 to the box).

Figure 3:
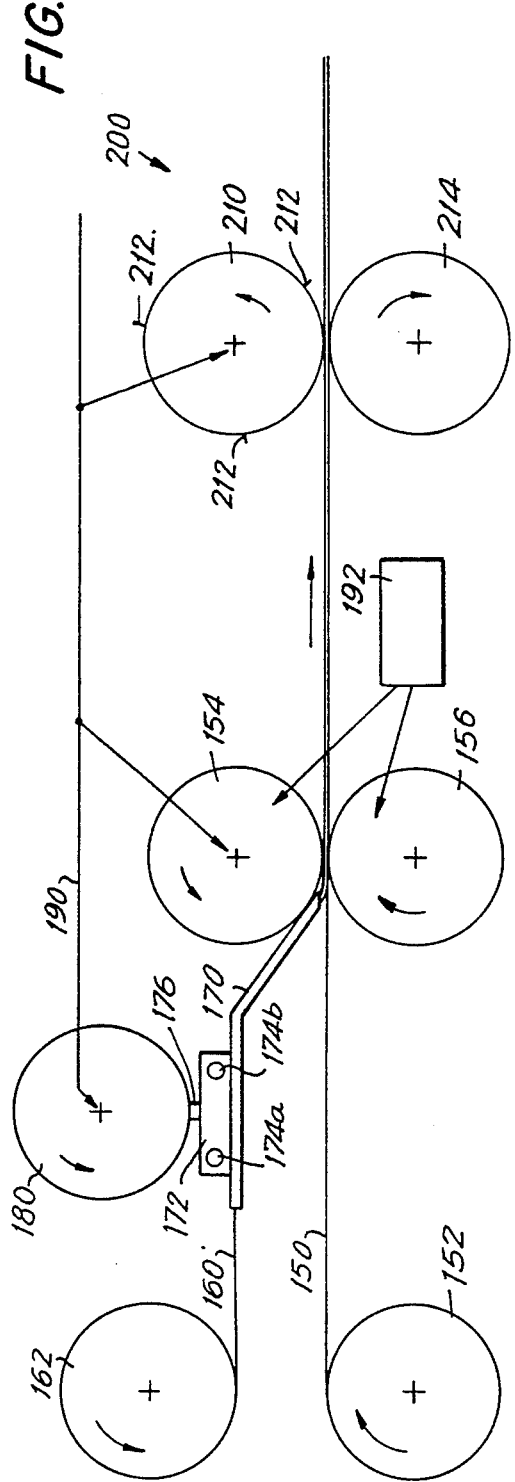
FIG. 3 is a simplified, partly schematic, elevational view of illustrative apparatus constructed in accordance with the principles of this invention for making the outer wrappers of this invention.
Figure 4:
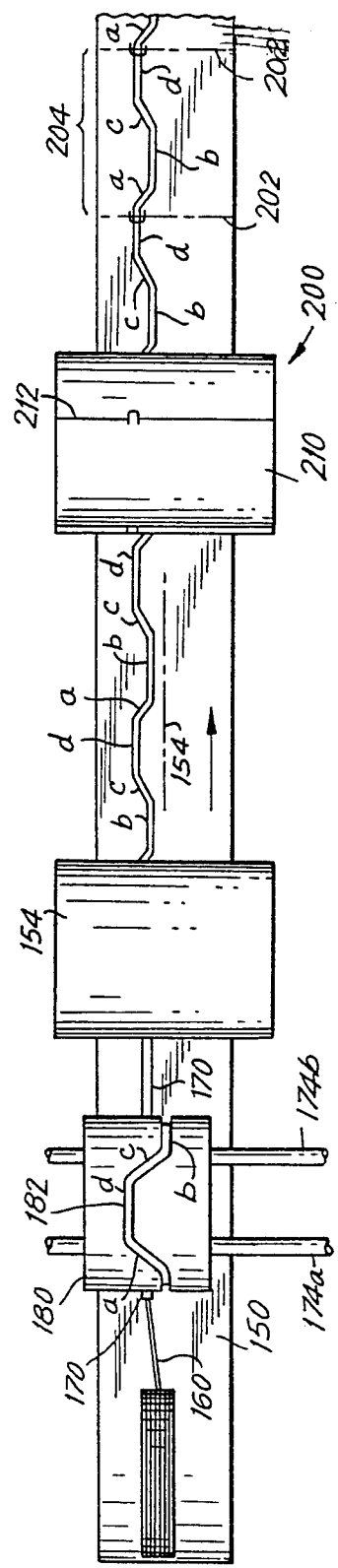
FIG. 4 is a plan view of the apparatus of FIG. 3.

FIGS. 3 and 4 illustrate methods and apparatus suitable for making outer like wrapper 140. A continuous web 150 of wrapper material (e.g., conventional polypropylene film) is drawn from supply roll 152 by passing it through the nip between driven pressure rollers 154 and 156. A continuous strand 160 of tear tape material (e.g., conventional polypropylene film, conventional monofilament polypropylene fiber, conventional multifilament natural or synthetic fiber string, or the like) is drawn from supply roll 162 by also passing it through the nip between rollers 154 and 156. On its way to rollers 154 and 156, strand 160 passes through hollow tube 170 which feeds the strand directly into the roller nip. Tube 170 is supported by carriage 172 which in turn is mounted on rails 174a and 174b for motion perpendicular to the longitudinal axis 154 of web 150.

The position of carriage 172 on rails 174 is controlled by cam follower pin 176 which projects from carriage 172 into cam track 182 in the annular outer surface of rotating drum 180. In particular, cam track 182 has some segments (a and c) which are aligned with longitudinal axis 154, and other segments (b and d) which are inclined relative to that axis. When cam follower pin 176 is in one of inclined cam track segments a or c, carriage 172 and tube 170 move up or down (as viewed in FIG. 4) perpendicular to longitudinal axis 154 as drum 180 rotates. This causes tube 170 to lay down a segment (i.e., a segment a or c) of tear tape strand 160 which is inclined relative to longitudinal axis 154. When cam follower pin 176 is in one of cam track segments b or d, carriage 172 and tube 170 remain stationary as drum 180 rotates. This causes tube 170 to lay down a tear tape strand segment (i.e., a segment b or d) which is parallel to longitudinal axis 154. Drum 180 is configured and driven in synchronism 190 with the remainder of the apparatus in order to produce the desired tear tape pattern on web 150. In the illustrative embodiment, this is a longitudinally repeating pattern of four longitudinal segments a–d. Segment a is inclined relative to axis 154 in the direction of motion of web 150 away from the web edge that will be near the top of the container. Segment b extends parallel to axis 154 from the end of segment a which is closer to the web edge that will be near the bottom of the container. Segment c extends from the end of segment b that is remote from segment a and is inclined in the opposite direction from segment a. Segment d extends parallel to axis 154 from the end of segment c which is remote from segment b. The dimension of each of segments a–c parallel to longitudinal axis 154 is equal to the width of the respective container wall 18, 12, 16 against which the associated longitudinal portion of web 150 will be placed. Segment d is slightly longer, parallel to axis 154, than the width of rear container wall 14 in order to leave some excess web 150 for overlap when the outer wrapper is wrapped around the container. The angle of inclination of segments a and c is identical to the angle of inclination of cuts 28 and 30.

Immediately after exiting from tube 170, tear tape strand 160 is pressed firmly against web 150 as both of elements 150 and 160 pass through the nip between pressure rollers 154 and 156. This causes strand 160 to adhere to web 150. If desired, this adherence may be enhanced in any of a number of ways. For example, either or both of rollers 154 and 156 may be embossing rollers for deforming one or both of elements 150 and 160 into one another. Alternatively or in addition, one or both of elements 150 and 160 (preferably element 150) may be coated with an adhesive coating such as a conventional wax, a conventional pressure sensitive adhesive, a conventional heat activated adhesive, a conventional acrylic coating, etc., to help secure tear tape strand 160 to web 150 as those elements pass between rollers 154 and 156. One or both of rollers 154 and 156 may be heated by any conventional means 192 to further promote adherence of elements 150 and 160, and in particular to activate any heat activated adhesive, acrylic coating, etc., that may be employed.

In addition to promoting adherence of tear tape strand 160 to web 150, the pressure and possibly heat applied by rollers 154 and 156 may be used to flatten out an initially substantially round strand 160 to the flat shape of a conventional tear tape. Use of a round strand 160 (whether or not it is flattened by rollers 154 and 156) may be desirable to eliminate any possibility of wrinkles in strand 160 where it curves in the transitions between adjacent segments a–d.

After leaving rollers 154 and 156, web 150 with tear tape 160 secured thereto passes to station 200 where it is conventionally cut or at least perforated along transverse lines 202 to form of delineate blanks 204, each of which is used to wrap one box 110 as shown in FIGS. 2 and 5. In the depicted embodiment, this cutting or perforation of web 150 is performed by passing web 150 between rotating knife drum 210 (having several angularly space blades 212) and co-rotating anvil drum 214. Note that knife drum 210 rotates in synchronization 190 with the other portions of the apparatus. Note, also that cuts or perforations 202 are located near the transitions between tear tape segments a and d, and that each cut or perforation 202 includes a small U-shaped portion at the location of the tear tape to cause the formation of tail 144 (see FIG. 2).

Figure 5:
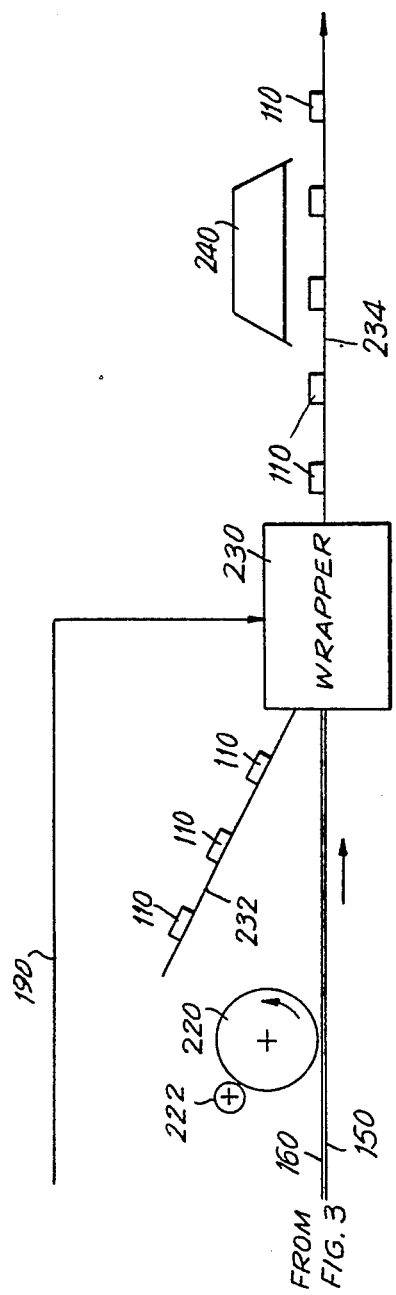
FIG. 5 is a simplified, partly schematic, elevational view of illustrative apparatus constructed in accordance with the principles of this invention for applying the outer wrappers produced by the apparatus of FIGS. 3 and 4.

After leaving station 200, web 150 (with patterned tear tape 160) passes to the apparatus shown in FIG. 5. If it is desired to secure outer wrapper 140 to the associated box 110 by an adhesive, that adhesive may be applied to the major surface of web 150 to which tear tape 160 has been secured by any suitable conventional apparatus such as rollers 220, 222, etc. Whether or not adhesive is thus applied, web 150 then passes to conventional wrapper 230, which also receives a stream 232 of unwrapped but otherwise finished boxes 110. Wrapper 230 (operating in synchronization 190 with the remainder of the apparatus) wraps and seals one outer wrapper blank 204 around each successive box 110 so that tear tape 160 is inside web 150. The wrapped boxes 110 are discharged from wrapper 230 in a stream 234. Each wrapped box 110 is as shown in FIG. 2. In particular, the tear tape 142 on each box is exactly aligned with the cuts 26, 28, and 30 defining the parting line between the upper and lower portions of the box.

If further processing of boxes 110 is required, that is performed by apparatus 240. For example, if boxes 110 are being shrink-wrapped, apparatus 240 may be conventional apparatus (e.g., heater apparatus) for causing the outer wrapper 140 to shrink tightly and smoothly around the associated box 110.

It will be understood that the foregoing is merely illustrative of the principles of the invention, and that various modifications can be made by those skilled in the art without departing from the scope and spirit of the invention. For example, the parting line between the relatively movable portions of the box could have a different shape, and the tear tape pattern could be modified accordingly. Similarly, although FIGS. 3 and 4 illustrate one way of producing a desired tear tape pattern on web 150, many other ways of accomplishing this result will occur to those skilled in the art. For example, carriage 172 could be driven by a motor or solenoid. As yet another example, strand 160 could be deflected by passing it directly over cam surfaces.

I claim:

1. A container product including (1) an inner member having a plurality of side walls forming a parallelepiped such that all of said side walls are substantially parallel to a single longitudinal axis, at least two of said walls being subdivided along a parting line so that said container product is subdivided into first and second relatively movable parts, said parting line defining a plane which is oblique to said single longitudinal axis, and (2) an outer wrapper wrapped around the outside of said inner member so that said outer wrapper overlaps itself and is sealed to itself at all of its edges in order to completely enclose said first and second parts with all of said outer wrapper material being completely outside of said inner member, said outer wrapper including (a) a web member having inner and outer surfaces, and (b) a tear strip adhered to one of said surfaces and superimposed on said parting line, said container product being made by a process comprising the steps of:

supplying said inner member in the form of said parallelepiped;

separately supplying said outer wrapper; and wrapping said outer wrapper around said inner member so that said tear strip is superimposed on said parting line, and so that when said outer wrapper is subsequently torn along said tear strip, the remaining portions of said outer wrapper tend to remain on said first and second parts.

2. The container product by process defined in claim 1 wherein said outer wrapper is secured to said inner member by an adhesive.

3. The container product by process defined in claim 1 wherein said outer wrapper shrinks when exposed to a shrinking agent, and wherein said process includes the step of:

exposing said outer wrapper wrapped around said inner member to said shrinking agent to cause said outer wrapper to shrink into contact with said inner member.

4. The container product by process defined in claim 3 wherein said shrinking agent is heat.

5. The container product by process defined in claim 1 wherein the relative strengths of said web member and said tear strip are selected so that said tear strip remains intact and tears said web member when said tear strip is pulled outwardly from said container product, thereby exposing said parting line and allowing said first and second parts to move relative to one another without interference from the remainder of said outer wrapper.

6. The container product by process defined in claim 1 wherein said tear strip is adhered to said inner surface.

7. The container product by process defined in claim 1 wherein said step of supplying said outer wrapper comprises the steps of:

feeding said web member parallel to a first longitudinal axis;

longitudinally feeding said tear strip into contact with said one of said surfaces so that at least some longitudinal segments of said tear strip are inclined relative to other longitudinal segments of said tear strip; and securing said tear strip to said one of said surfaces.

8. The container product by process defined in claim 7 wherein successive longitudinal segments of said tear strip are fed into contact with respective successive longitudinal segments of said one of said surfaces.

9. The container product by process defined in claim 8 wherein successive longitudinal segments of said tear strip are fed into contact with said one of said surfaces in a longitudinally ordered pattern of first through fourth longitudinal segments, said first segment being parallel to said first longitudinal axis, said second segment being transverse to said first longitudinal axis, said third segment being parallel to said first longitudinal axis and longitudinally and laterally spaced from said first segment, and said fourth segment being transverse to said first longitudinal axis.

10. The container product by process defined in claim 7, wherein said step of securing said tear strip to said one of said surfaces comprises the step of:

pressing said tear strip and said web member together.

11. The container product by process defined in claim 10 wherein said step of pressing said tear strip and said web member together comprises the step of:

passing said tear strip and said web member through the nip between a pair of rollers.

12. The container product by process defined in claim 11 further comprising the step of:

heating at least one of said rollers.

13. The container product by process defined in claim 1 wherein said web member is polypropylene.

14. The container product by process defined in claim 1 wherein said tear strip is selected from the group consisting of polypropylene film, monofilament polypropylene fiber, multifilament natural fiber string, and multifilament synthetic fiber string.

15. The container product by process defined in claim 1 wherein said tear strip is adhered to said one of said surfaces by embossing said tear strip and said web member together.

16. The container product by process defined in claim 1 wherein said tear strip is adhered to said one of said surfaces by means of an adhesive.

17. The container product by process defined in claim 16 wherein said adhesive is selected from the group consisting of wax, acrylic, pressure sensitive adhesive, and heat activated adhesive.

* * * * *

UNITED STATES PATENT AND TRADEMARK OFFICE
CERTIFICATE OF CORRECTION

PATENT NO. : 4,947,994
DATED : August 14, 1990
INVENTOR(S) : Reginald W. Newsome It is certified that error appears in the above-identified patent and that said Letters Patent is hereby corrected as shown below:

Cover Page, Item [73]: Change "Scepter Manufacturing Company Limited, Don Mills, Ontario, Canada" to --Philip Morris, Incorporated, New York, New York--.

Cover Page, After "Attorney, Agent, or Firm--", change "Blake, Cassels & Graydon" to --Robert R. Jackson--.

Signed and Sealed this

Seventh Day of January, 1992

Attest:

HARRY F. MANBECK, JR.

*Attesting Officer*     *Commissioner of Patents and Trademarks*